Patented Feb. 2, 1937

2,069,546

UNITED STATES PATENT OFFICE 2,069,546

SEPARATION OF CHLORANISIDINE ISOMERS

Thomas S. Carswell, Kirkwood, Mo., assignor to Monsanto Chemical Company, St. Louis, Mo., a corporation of Delaware No Drawing. Application January 21, 1935, Serial No. 2,747

10 Claims. (Cl. 260—130.5)

This invention relates to separation of mixtures of isomeric organic compounds into their components and it has particular relation to the separation of mixtures of such materials where separation by such methods as distillation, crystallization, etc. usually employed to separate organic compounds are impracticable.

The main objects of the invention are:

To provide a process of separating 4-chloranisidine from a mixture of the 4 and 5-chlor isomers;

Conversely, to provide a process of separating 5-chloranisidine from a mixture thereof with 4-chloranisidine;

To provide a process of separating 4 and 5-chloranisidine from each other which is simple, which does not involve use of expensive reagents, which gives excellent yields of the isomers in substantially pure state.

Chloranisidine is usually obtained as a mixture of the 4-chlor and 5-chlor isomers having, respectively, the formulae:

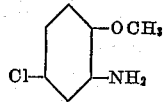

and

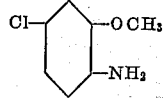

These products have been suggested as intermediates in the preparation of certain dyes for which purpose they are highly satisfactory. However, for such purpose the separation of the mixture into its components is essential because each of the isomers obviously has its own characteristic tinctorial properties and the mixtures thereof cannot be used because of variability in these properties. Heretofore separation of the mixture into individual isomers has been extremely difficult or practically impossible because the boiling points of the two isomers very nearly correspond and by ordinary processes separation by crystallization was also impracticable because after a fraction of the 5-chlor isomer was dissolved out it became difficult or impossible to remove further amounts to obtain the pure 4-chlor product. Accordingly, the cost of the material has been so great as to preclude it from any appreciable commercial application.

The present invention is based upon the discovery that the 4-chlor isomer of chloranisidine may be partially separated from the 5-chlor isomer by certain convenient manipulations and the residue containing a greatly increased proportion of the 5-chlor isomer may then be subjected to acidification with an acid to form salts of the 5-chlor isomer which are much less water soluble than the corresponding 4-chlor isomer. A proportion of the 5-chlor salts is then obtained from the water solution and the residue, consisting of a mixture of 4 and 5-chlor products, is recycled for further separation of the isomers.

Applicant has developed a plurality of methods of effecting the removal of the 4-chlor isomer. According to one of these methods the material is treated with a solvent which retains in solution the 5-chlor isomer while permitting the 4-chlor product to crystallize out. The 4-chlor product is then recovered in substantially pure state and the liquor containing the 5-chlor material is subjected to evaporation to remove the solvent and then to acidification with a suitable acid to form the relatively water insoluble 5-chloranisidine salts.

An alternative procedure involves obtaining the mixture of isomers in a liquid oily state and then subjecting it to cooling. The 4-chlor isomer, which usually is in preponderance of the eutectic mixture, will then separate as a crystalline material until the mixture approaches the eutectic point, after which the liquor consisting of substantially all of the 5-chlor isomer, together with some of the 4-chlor isomer, is drained off. It is then subjected to acidification to form the water insoluble 5-chlor isomer.

In the practice of the invention where the 4-chlor isomer is obtained by solution of the 5-chlor isomer, substantially any solvent exerting a preferential solvent action upon 5-chloranisidine may be employed. Benzene, toluene, iso propyl ether, ether, etc. constitute specific examples of such solvents. However, these are merely included by way of illustration. Numerous other solvents may also be employed in similar manner.

Various acids may also be employed in the formation of the insoluble acid salt of the 5-chlor isomers. These acids include sulfuric acid, nitric acid, acetic acid, oxalic acid, benzoic acid, etc. Sulfuric acid, however, probably is preferable from a commercial standpoint because it is relatively inexpensive to obtain.

The following constitutes a specific example of one application of the principles of the invention:

Approximately 1700 grams of a mixture of monochloranisidines obtained by chlorination of o-anisidine, from which the dichlor product had been removed by distillation and containing about 100 parts of 4-chloranisidine to 62 parts of 5-chloranisidine, were dissolved in approximately 1000 cc. of dry benzene at 60° C. and then allowed slowly to cool overnight (a period of about 15 hours), the temperature being finally reduced to 10° C. by cooling upon an ice bath. A white crystalline precipitate was obtained and this was carefully dried by suction upon a filter, after which it was washed with 250 cc. of cold benzene and then with 500 cc. of essentially normal heptane having a boiling range of 86° C. to 100° C. The yield of crystalline material amounted approximately to 665 grams and consisted of essentially pure 4-monochloranisidine having a melting point of 82.8°. The residue was a reddish oil having, after evaporation of the solvent, a melting point of 29° C. The residue, weighing 1036 grams, consisted of a mixture of 5-chloranisidine together with some of the 4-chlor product which had passed into solution. Apparently it was of essentially eutectic proportions. Further separation of the 4-chlor isomer from this mixture by simple treatment with a solvent was found to be impossible.

In order to obtain the 5-chloranisidine the mixture was then subjected to boiling in 8000 cc. of water containing 430 grams of 96% sulfuric acid. Upon the conclusion of the boiling operation, 240 grams of undissolved oil separated off and the resulting clear aqueous solution was cooled to 20° C. A crystalline product was obtained by filtration which apparently consisted essentially of the sulfates of chloranisidines. This crystalline product was washed with a little water and the filter cake was redissolved in approximately 4000 cc. of boiling water. Upon cooling 360 grams of dry crystallized sulfate of 5-chloranisidine were obtained. The salt was neutralized with 20% caustic soda and the oil which resulted was subjected to distillation to remove water. From this treatment there resulted 265 grams of 5-chloranisidine with a crystallizing point of 51.2° C. which corresponds quite closely to the value of 52° C. given by the literature.

The filtrates remaining after removal of the crystalline sulfate and consisting of a solution of the mixture of 4-chlor and 5-chloranisidine in approximately the same ratio as occurred in the original product, was neutralized and the oil obtained subjected to distillation. By this operation 551 grams of mixed chloranisidines with a crystallizing point of 45.2° C. were obtained. The undissolved oil, separating upon the initial boiling with water and acid, was also made alkaline and was then subjected to redistillation. The fraction upon cooling gave a second crop consisting of 212 grams of a crystalline mixture of the two isomers. This crop was combined with the 551 gram crop and the two were returned for benzene treatment for the further removal of the 4-chlor isomer. The residue, after removal of the 4-chlor product, was then subjected to a second step of acidification. This cycle was continued until the separation of the two isomers was substantially complete.

It will be appreciated that the mixture of isomers of chloranisidine may also be subjected initially to acidification followed by crystallization of the salt of the 5-chlor isomer from the aqueous solution and that the treatment with a solvent for purposes of removing the 4-chlor isomer may follow as the second step. However, this latter method of procedure usually is less desirable than initial treatment with solvent for purposes of effecting separation of the 4-chlor isomer because the 4-chlor material usually is in excess of the 5-chlor and by conducting extraction thereof as the initial step the amount of material remaining for subsequent acidification is materially reduced.

From the foregoing description it will be apparent that the invention provides an extremely simple process whereby mixtures of 4-chlor and 5-chlor anisidine may be separated substantially completely into their components. The process does not require the use of expensive reagents or complicated manipulations.

Although only the preferred forms of the invention have been disclosed it will be apparent to those skilled in the art that these forms are merely exemplary and that numerous modifications may be made therein without departure from the spirit of the invention or the scope of the appended claims.

What I claim is:

1. A method of separating a mixture of 4- and 5-chloranisidines consisting preponderantly of the 4-chloranisidine which comprises removing a portion of substantially pure 4-chloranisidine as a solid from a solution of 4- and 5-chloranisidines in an inert organic solvent, thereby leaving a solution of mixed 4- and 5-chloranisidines in which the proportion of the 4-chlor isomer has been substantially decreased, acidifying the mixture of the two isomeric anisidines with aqueous acid, crystallizing out a part of the 5-chloranisidine acid addition salt from the aqueous acid solution, and neutralizing the solution of unseparated 4- and 5-chloranisidines.

2. A method of removing 5-chloranisidine from a mixture thereof with 4-chloranisidine which comprises acidifying the mixture with an aqueous solution of acid to form an acid addition salt of 5-chloranisidine, crystallizing the salt from its aqueous solution, then neutralizing the material obtained by crystallization to produce 5-chloranisidine.

3. A method of separating 5-chloranisidine from mixtures thereof with 4-chloranisidine which comprises removing a portion of the 4-chloranisidine, subjecting the residue to acidification with an aqueous solution of acid to form an acid addition salt of 5-chloranisidine, crystallizing the 5-chloranisidine salt from its aqueous solution and subsequently neutralizing it to obtain 5-chloranisidine.

4. A method of separating a mixture of 4- and 5-chloranisidines into its components comprising treating the mixture with a solvent exerting a preferential solvent action upon 5-chloranisidine, crystallizing the 4-chloranisidine from the solution, removing the crystalline 4-chloranisidine, removing the solvent from the residue, acidifying the residue with an aqueous solution of acid to form an acid addition salt of 5-chloranisidine and crystallizing the acid salt of 5-chloranisidine from its aqueous solution.

5. A process as defined in claim 4 in which the cycle of operation is repeated upon the unseparated residue until the mixture of anisidines is substantially completely separated into its components.

6. A method of removing 5-chloranisidine from its mixture with 4-chloranisidine comprising acidifying the mixture with aqueous sulfuric acid to form 5-chloranisidine sulfate, crystallizing the 5-chloranisidine sulfate from the aqueous solution and neutralizing it to obtain 5-chloranisidine.

7. A process as defined in claim 6 in which a portion of the 4-chloranisidine is removed prior to the acidification.

8. A process as defined in claim 6 in which 4-chloranisidine is obtained by treating the mixture prior to acidification with a solvent and the 4-chloranisidine is crystallized from the solution, after which the solvent is evaporated prior to acidification of the residue.

9. A method as defined in claim 6 in which the aqueous solution after removal of the 5-chloranisidine acid addition salts, is neutralized and subjected to a repetition of the cycle of operation.

10. A method of separating 4-chloranisidine from a mixture thereof with 5-chloranisidine which comprises cooling a liquid mixture thereof until a portion of the 4-chlor material crystallizes out, acidifying the residue with an aqueous solution of acid to form an acid addition salt of 5-chloranisidine, separating the acid crystals of 5-chloranisidine, neutralizing the acid solution, and repeating the cycle upon the residue until separation is substantially complete.

THOMAS S. CARSWELL.